Feb. 18, 1941.                    W. H. EVANS                    2,232,517
                MINE VENTILATING TUBING AND COUPLING MEANS THEREFOR
                        Filed June 26, 1939          2 Sheets-Sheet 1
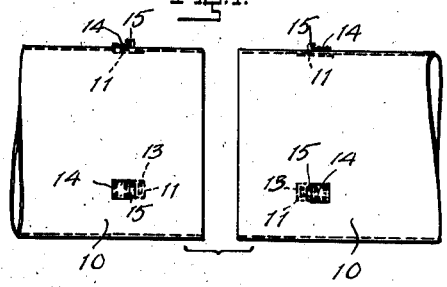
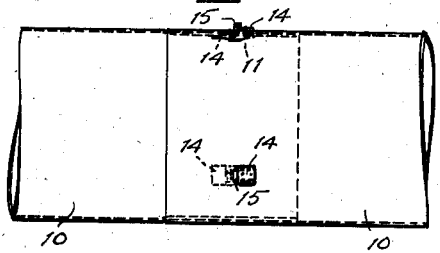
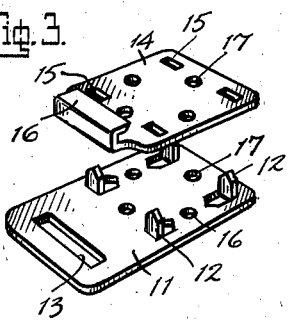
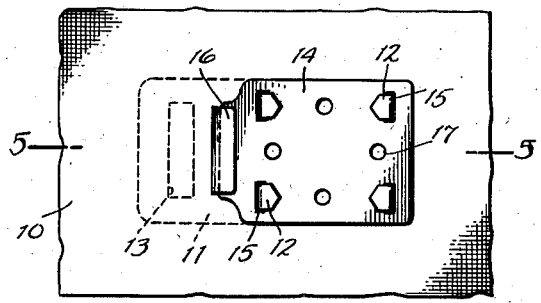
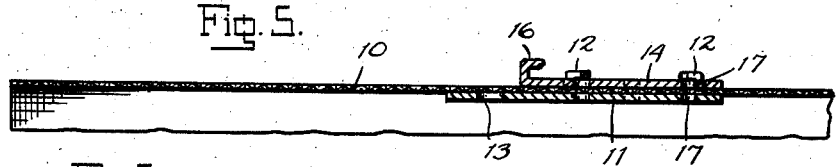
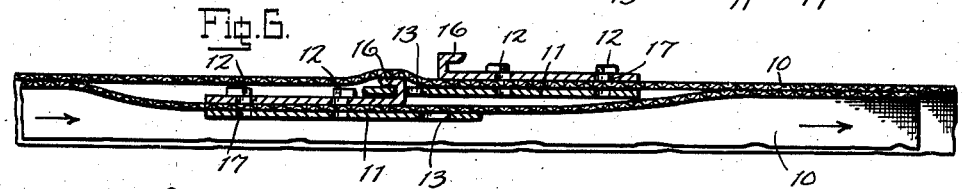
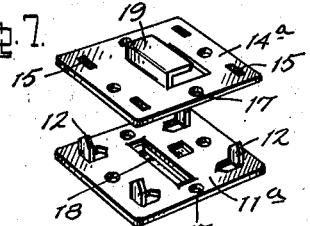
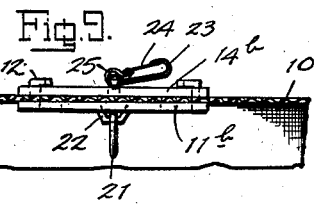
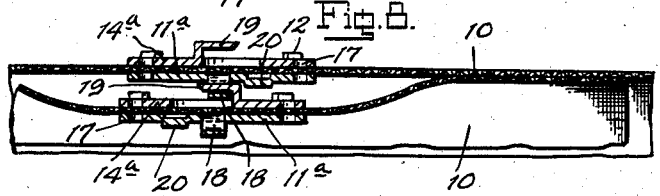
INVENTOR
WILLIAM HOOPER EVANS.
BY
ATTORNEY

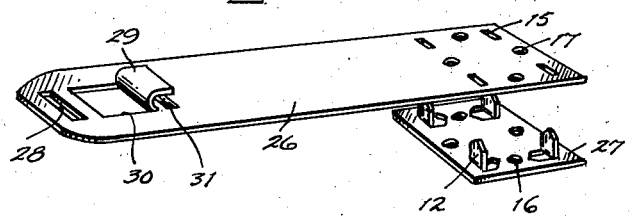
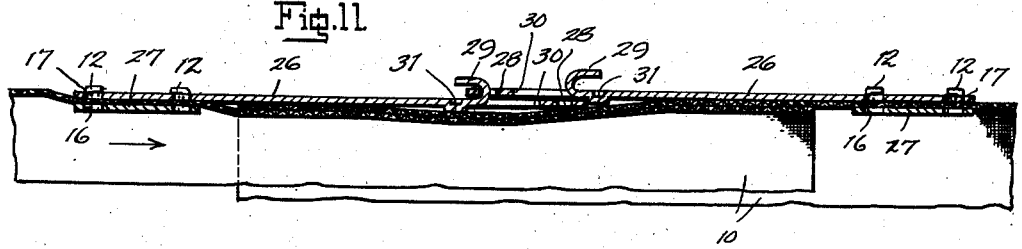
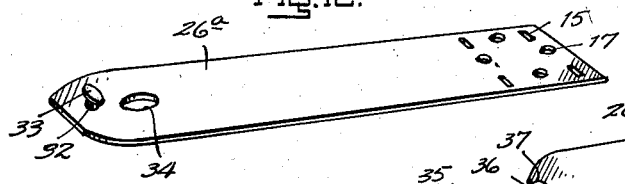
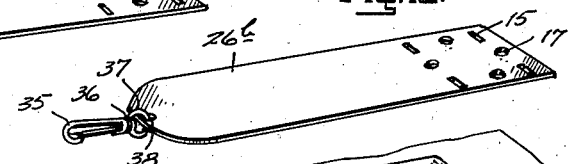
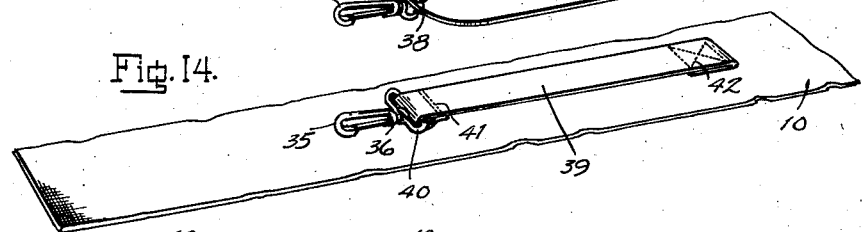
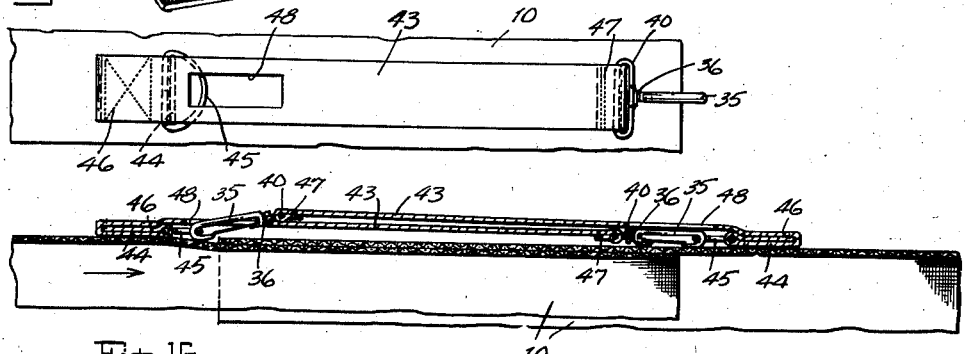

Patented Feb. 18, 1941

2,232,517

UNITED STATES PATENT OFFICE 2,232,517

MINE VENTILATING TUBING AND COUPLING MEANS THEREFOR

William Hooper Evans, St. Louis, Mo.

Application June 26, 1939, Serial No. 281,189

8 Claims. (Cl. 285—71)

The present invention relates to an improvement in mine ventilating tubing and coupling therefor. Ventilating tubing of this type comes in sections of varying lengths, which sections are coupled together in the mine, and heretofore the coupling means have consisted for the most part of rigid bands or rings secured in the ends of the sections of tubing, which in some cases were adapted to expand or contract to couple together the ends of the tubing, and in other cases were provided with clamping bands, bolts and nuts, and the like. Such coupling means is expensive, is apt to become damaged in the mine, makes it difficult to dismantle the tubing for the purpose of moving it, and prevents collapsing of the ends of the tubing for conveniently rolling it into compact rolls.

Under present conditions of mining, with the rapid development and adaptation of mechanical labor saving conveyor equipment for quick loading and handling of coal and other mined products under-ground, it is necessary to move the tubing at frequent intervals, sometimes every ten or twelve days, whereas under the older methods the tubing was only moved at infrequent intervals, for instance, once every four or five months or in some cases about once every year. Also with the present methods of mining the lines of tubing are shorter than heretofore, being not more than 300 feet, so that absolutely air-tight joining is not so essential as it has been in the past, where the line of tubing would be 1000 feet or more, and where an air-leakage at the joints would seriously affect the efficiency of the whole line.

Requirements under the present mining methods are for a joint that may be quickly connected without the necessity for tools or other parts that may be lost, tubing sections that are interchangeable and can be speedily handled, that is, can be easily rolled up into compact rolls and conveniently transported. It is an object of the present invention to provide a tubing and coupling means therefor which will meet these present requirements, and to this end I propose to provide tubing sections adapted to be connected together without the use of rigid bands or rings, the ends of the sections being flexible and completely collapsible. One end of a section of tubing is adapted to be slipped into the end of the adjacent section a distance to provide a sufficient overlapping, so that the inserted end of the tubing will hold tightly against the sides of the outer tubing, the inserted end extending in the direction of the air flow, so that there will be a substantially air-tight connection. It is further proposed to provide anchoring means upon the ends of the tubing at circumferentially spaced points, so that they will not prevent the ends of the tubing from being readily collapsed into flat form and rolled. Another object is to provide anchoring means which may be readily connected while the tubing is collapsed and will automatically interlock when there is air pressure in the tubing to prevent separation of the sections of the tubing through strains imposed thereon.

It is further proposed to provide such anchoring means which will be identical upon both ends of the tubing, permitting the ends to be interchangeably used. A further object is to provide such anchoring means which may be fastened to the tubing underground, if necessary, and which may be shipped in bulk without the necessity for special crating and without danger of being crushed or damaged.

With the above and other objects in view, embodiments of the invention are shown in the accompanying drawings, and these embodiments will be hereinafter more fully described with reference thereto, and the invention will be finally pointed out in the claims.

In the drawings:

Fig. 1 is a side elevation showing the ends of two ventilating tubing sections in separated relation.

Fig. 2 is a similar view showing the two ends connected, one being slipped into the other end and being secured by anchoring means.

Fig. 3 is a perspective view of one of the anchoring means, its two parts being shown in separated relation, before attachment to the tubing.

Fig. 4 is a plan view showing the anchoring means secured to the tubing.

Fig. 5 is a longitudinal sectional view taken along the line 5—5 of Fig. 4.

Fig. 6 is a longitudinal sectional view showing the ends of the two sections of the tubing connected together.

Fig. 7 is a perspective view of a modified form of anchoring means.

Fig. 8 is a longitudinal sectional view showing anchoring means as illustrated in Fig. 7 secured to the ends of two tubing sections, and the two sections connected together.

Fig. 9 is a side elevation of a further modified form of anchoring means shown secured to the end of a tubing section, the latter being shown in longitudinal section.

Fig. 10 is a perspective view of another modified form of anchoring means.

Fig. 11 is a longitudinal sectional view showing the ends of two sections of tubing provided with anchoring means according to the modification shown in Fig. 10 and connected together.

Fig. 12 is a perspective view of another modified form of anchoring means.

Fig. 13 is a perspective view of still another modified form of anchoring means.

Fig. 14 is a perspective view of a further modified form of anchoring means, connected to the end of a section of tubing.

Fig. 15 is a plan view of another modified form of anchoring means and showing the same secured to the end of a section of tubing.

Fig. 16 is a longitudinal sectional view showing the ends of two sections of tubing provided with anchoring means as shown in Fig. 15 connected together.

Similar reference characters indicate corresponding parts throughout the several figures of the drawings.

Referring to the drawings and more particularly to Figs. 1 and 2 thereof, the end portions of two sections of the flexible ventilating tubing 10, which is formed of suitable flexible airtight fabric, such as coated canvas or the like, are each provided with anchoring units in spaced relation to their edges, these anchoring units being provided at circumferentially spaced points, and the anchoring units of one section adapted to interlock with the anchoring units of the other section, when one section is inserted within the other section. While three anchoring units are shown at equally spaced points, it will be understood that in the case of smaller diameter tubing two anchoring units may be employed, and in the case of larger diameter tubing a greater number of units may be employed. The anchoring units are such, as will presently more fully appear, that they may be readily connected or unconnected when the tubing is collapsed, that is, when there is no air pressure therein, and the air pressure will cause them to cooperate with each other so that they will not become accidentally disengaged.

As shown in Figs. 3 to 6 the anchoring unit comprises a rectangular inner plate member 11, provided with a series of upwardly projecting prongs 12 lanced therefrom, two of these prongs being arranged adjacent the corners of the plate at one end, and two of them being substantially spaced from the other end. A slot 13 is provided in parallel relation to the forward end of the plate. An outer plate member 14 is provided with a series of slots 15 adapted to be engaged by the prongs 12 of the inner plate member, the prongs being engaged through the tubing disposed between the plate members and clamped over upon the outer plate member to secure the anchoring unit to the tubing, as shown in Fig. 4. The plate 14 is provided at its forward end with an outwardly projecting and rearwardly bent hook portion 16 which is adapted to be engaged with the slot 13 of a similar anchoring unit provided upon the other of the two sections of tubing to be attached. In addition to the prongs 12 and slot 15 the plates are provided with rivet holes 17—17 respectively so that if desired the plates may be riveted together, this being desirable in the event that the prongs become broken.

As shown clearly in Figs. 4 and 5 the slotted end of the plate 12 projects forwardly with respect to the hooked end 13 of plate 14, so that a clearance space is provided to enable the tubing to be forced outwardly when the hook portion of one anchoring unit is secured in the slot of the other, as shown in Fig. 6. The two sections of tubing are joined together while they are in a collapsed state. The spacing of the forward prongs 12 with respect to the end of the hook 16 is such that it is necessary to hold the clamping units at an angle to each other in order to engage the hook of one unit with the slot of the other, the depth of the space beneath the hook being sufficiently greater than the thickness of the plate 11 to permit this. When so engaged and disposed in parallel relation, as shown in Fig. 6, the air pressure within the tubing will force the inserted portion of the one tubing section outwardly against the wall of the other tubing section, and in this relation the forward prongs 12 will constitute an abutment opposed to the end of the plate member 11, which will prevent disengagement of the units through parallel movement. It will therefore not be possible for the sections to become accidentally disconnected, as long as there is air pressure within the tubing. The arrows in Fig. 6 indicate the direction of the air flow. However, upon collapse of the tubing the anchoring units may be readily disconnected simply by tilting one with respect to the other.

In Figs. 7 and 8 I have illustrated a modified form of anchoring unit in which a pair of rectangular plate members 11ª and 14ª are provided in a similar manner to the plate members 11 and 14 of the first embodiment with prongs 12 and slots 15 respectively, and with rivet holes 17—17 respectively. The plate member 11ª is provided with a strap portion 18, lanced and pressed downwardly therefrom, and which is adapted to be engaged by a hook portion 19 lanced and bent upwardly from the plate member 14ª. At one side of the strap portion 18 there is provided a downwardly embossed lug 20, which in the engaged relation of the hook with the strap portion, as shown in Fig. 8 prevents disengagement through parallel movement, it being necessary to engage or disengage the hook to tilt one of the anchoring units relative to the other. The clearance between the hook portion and the surface of the plate 14ª is sufficient with respect to the thickness of the strap portion and the spacing of the strap portion with respect to the plate member 11ª to permit this tilting movement.

In Fig. 9 I have shown a further modified form of anchoring unit in which the inner plate member 11ᵇ is provided with a ring 21 secured by a retaining strap portion 22 lanced and pressed from the plate, and the outer plate member 14ᵇ is provided with a snap hook 23 having a spring 24 extending across its entrance opening, this snap hook being pivotally connected to the plate by a retaining strap portion 25 lanced and pressed outwardly from the plate. In this embodiment the outwardly disposed snap hooks of the anchoring units at the end of one of the sections of the tubing are snapped into engagement with the inwardly disposed rings of the anchoring units at the end of the other section, thereby retaining the sections together. It will be understood that in the collapsed condition of the tubing the hand may be inserted between the overlapping ends of the engaged tubing sections to manipulate the snap hooks either to connect or disconnect them.

In Figs. 10 to 16 I have illustrated several modifications in which the anchoring units are provided entirely upon the outer surfaces of the tubing sections. In Figs. 10 and 11, the anchoring unit shown therein comprises an elongated plate member 26 provided adjacent its rearward end with slots 15 and rivet holes 17, in a similar manner to the embodiment shown in Figs. 1 to 6 for the purpose of clamping the plate member 26 upon the outer side of the tubing section 10 by means of a clamping plate member 27 provided with upwardly projecting prongs 12 and rivet holes 16, the prongs adapted to be inserted upwardly through the tubing through the slots 15 and clamped upon the outer surface of the plate 26, as shown clearly in Fig. 11.

At the forward end of the plate 26 there is provided a slot 28 and a rearwardly bent outwardly projecting hook 29 rearwardly spaced from the slot 28, this hook being formed by lancing and bending from a hole 30 in the plate member. An abutment rib 31 is downwardly embossed from the plate 26 in contiguous relation to the hook 29, and is so positioned that in the engaged position of the two anchoring units, as shown in Fig. 11, the end of the unit, which has its hook 29 engaged in the slot 28 of the other unit, is in abutting relation with the rib 31 to prevent longitudinal shifting when the clamping units are maintained in substantially parallel relation by the air pressure within the tubing. In order to engage or disengage the units they are moved into an angular relation, so that the end of one anchoring unit clears the rib 31 of the other anchoring unit. The positioning of the units with respect to the end of the tubing section is such that when the end of one section is inserted into the end of the other the outwardly disposed section enters beneath the clamping units of the inwardly disposed section, so that there is sufficient overlap to maintain an effective air-tight joint.

In Fig. 12 I have illustrated a modification in which the plate member 26ª is provided at its forward end with an outwardly projecting stud 32 having a transversely disposed elongated head 33, and which may be oval, rectangular or other suitable shape. In inwardly spaced relation of this stud there is provided an elongated slot 34, which is adapted to receive the stud 32 of the cooperating unit in interlocking relation. It will be understood that in engaging the stud with the slot the two anchoring units are turned into angular relation with each other to permit the head 33 to enter the slot 34, the head moving into locking relation as the clamping units are moved into longitudinal alignment. The flexibility of the collapsed tubing permits this action. The plate member 26ª is provided with slots 15 and rivet holes 17, and is adapted to be secured to the tubing section in the same manner as the plate member 26 by means of a clamping plate 27.

In Fig. 13 I have shown a further modified form of anchoring unit comprising a plate 26ᵇ having a snap hook 35 secured to its forward end, this snap hook being swivelly connected at 36 to a ring 37 which engages a hole 38 in the plate member. The plate member 26 is provided with slots 15 and rivet holes 17 and is also adapted to be secured to the tubing section in a similar manner to the plate 26 by means of a clamping plate 27. In connecting the tubing sections the snap-hooks of the anchoring units of one section will be connected to the snap-books of the anchoring units of the other section.

In Fig. 14 I have shown another modified form of anchoring unit substantially like that shown in Fig. 13, but instead of a rigid plate the snap hook 35 is connected to a flexible strap 39, which may be of canvas or other suitable material. The snap hook is swivelly connected at 36 to an elongated ring member 40 through which the end of the strap is engaged and secured by stitching, as at 41. The strap is secured to the tubing section 10 by folding under the rearward end and stitching as at 42.

In Figs. 15 and 16 I have illustrated a still further modified form of anchoring unit consisting of a flexible strap 43, of canvas or other suitable material having its inner end double-folded upon itself, as at 44, to secure a ring member 45 beneath the strap, the rearward end of the strap adapted to be secured to the tubing section 10 by stitching 46. At the forward end of the strap there is secured a snap hook 35 swivelly connected at 36 to an elongated ring member 40, the strap being inserted through this ring member and secured by stitching 47. The strap is provided near its rearward end with an elongated slot 48 and in the connected relation of the two ends of the tubing the snap hook of each of the anchoring units provided upon the outer section is inserted through the slot 48 of the cooperating anchoring unit of the inserted section and secured to the ring member 45 thereof. The snap hook 35 of the anchoring unit of the inserted section is disposed beneath the strap member of the anchoring unit of the outer section and is connected to the ring member 45 of this anchoring unit. The anchoring unit as shown in Figs. 15 and 16 may be inverted, if desired, that is, attached to the tubing so that the ring 45 is on top of the strap 43.

I have illustrated and described preferred and satisfactory embodiments of the invention, but it will be obvious that changes may be made therein within the spirit and scope thereof, as defined in the appended claims.

Having thus described my invention what I claim and desire to secure by Letters Patent is:

1. A coupling for flexible collapsible mine ventilating tubing adapted to be folded into a flat strip throughout its length, comprising a plurality of cooperating fastening means disposed at spaced intervals throughout the tube ends thereof adapted to be assembled in cooperative relation with the end of one section of tubing inserted in the adjacent end of another section and held by the force of air flow through the tubing.

2. A coupling for flexible collapsible mine ventilating tubing adapted to be folded into a flat strip throughout its length, comprising a plurality of cooperating hooks and eyes disposed at spaced intervals throughout the tube ends thereof adapted to be assembled in cooperative relation with the end of one section of tubing inserted in the adjacent end of another section and held by the force of air flow through the tubing.

3. The invention as defined in claim 1, further characterized by a plurality of anchoring means contiguous to the ends of each of said sections, said anchoring means being circumferentially spaced, the anchoring means upon said inserted end adapted to interlockingly engage with the anchoring means upon said receiving end.

4. The invention as defined in claim 1, further characterized by a plurality of anchoring units contiguous to the ends of each of said sections, said anchoring units being circumferentially spaced and each comprising a locking part upon the outer side of the tubing section and a locking part upon the inner side, the locking parts upon the outer side of said inserted end adapted to interlockingly engage with the locking parts upon the inner side of said receiving end.

5. The invention as defined in claim 1, further characterized by a plurality of anchoring units contiguous to the ends of said sections, said anchoring units being circumferentially spaced, and each comprising a pair of plate members, means arranged to secure said plate members together one at the outer and the other at the inner side of the tubing section, connection means upon one of said plates, the connection means of one of said tubing sections adapted to be interlockingly engaged with the connection means of the other tubing section.

6. The invention as defined in claim 1, further characterized by a plurality of anchoring units contiguous to the ends of said sections, said anchoring units being circumferentially spaced, and each comprising a pair of plate members, means arranged to secure said plate members together one at the outer and the other at the inner side of the tubing section, connection means upon one of said plates, the connection means of one of said tubing sections adapted to be interlockingly engaged with the connection means of the other tubing section, and abutment means on one of said plate members arranged to oppose separation movement through relative parallel movement, and permit separation upon tilting of one unit relatively to the other.

7. The invention as defined in claim 1, further characterized in that said fastening means each comprise a pair of plate members, means arranged to secure said plate members together one at the outer and the other at the inner side of the tubing section, hook means upon one of said plates and slot means upon the other of said plates, the hook means of one of said tubing sections adapted to be interlockingly engaged with the slot means of the other tubing section.

8. The invention as defined in claim 1, further characterized in that said fastening means each comprise a pair of plate members, means arranged to secure said plate members together one at the outer and the other at the inner side of the tubing section, hook and slot means upon one of said plates, the hook means of one of said tubing sections adapted to be interlockingly engaged with the slot means of the other tubing section.

WILLIAM HOOPER EVANS.